(12) United States Patent
Viavant et al.

(10) Patent No.: US 7,975,288 B2
(45) Date of Patent: Jul. 5, 2011

(54) METHOD AND APPARATUS FOR IMPOSING QUORUM-BASED ACCESS CONTROL IN A COMPUTER SYSTEM

(75) Inventors: Steven Viavant, Piedmont, CA (US); Sashikanth Chandrasekaran, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1077 days.

(21) Appl. No.: 11/416,692

(22) Filed: May 2, 2006

(65) Prior Publication Data
US 2007/0261103 A1 Nov. 8, 2007

(51) Int. Cl.
*G06F 7/04* (2006.01)
(52) U.S. Cl. .................. 726/2; 726/4; 726/10; 713/155; 713/156; 713/172; 713/182; 713/189; 705/51
(58) Field of Classification Search .................. 726/1, 2, 726/4, 6, 10; 709/203, 217; 705/1, 51; 713/155, 713/156, 172, 182, 189
See application file for complete search history.

(56) References Cited

U.S. PATENT DOCUMENTS

| | | | | |
|---|---|---|---|---|
| 4,882,752 A | * | 11/1989 | Lindman et al. | 713/166 |
| 5,961,586 A | * | 10/1999 | Pedersen | 709/201 |
| 5,987,506 A | * | 11/1999 | Carter et al. | 709/213 |
| 6,021,496 A | * | 2/2000 | Dutcher et al. | 726/21 |
| 6,681,238 B1 | * | 1/2004 | Brice et al. | 718/1 |
| 6,775,668 B1 | | 8/2004 | Goel | 707/9 |
| 6,920,455 B1 | * | 7/2005 | Weschler | 707/100 |
| 6,934,737 B1 | | 8/2005 | Tang et al. | 709/204 |
| 7,177,839 B1 | * | 2/2007 | Claxton et al. | 705/44 |
| 7,555,770 B2 | * | 6/2009 | Gottipati et al. | 726/2 |
| 2002/0078260 A1 | * | 6/2002 | Hart et al. | 709/329 |
| 2004/0025048 A1 | * | 2/2004 | Porcari et al. | 713/200 |

FOREIGN PATENT DOCUMENTS
WO WO2006104324 * 5/2006

* cited by examiner

*Primary Examiner* — Taghi T Arani
*Assistant Examiner* — Gregory Lane
(74) *Attorney, Agent, or Firm* — Park, Vaughan, Fleming & Dowler LLP; Shun Yao (57) ABSTRACT

One embodiment of the present invention provides a system for executing a command on a computer system. During operation, the system receives a signed command from a first quorum member at a security manager, wherein one or more quorum members must accept the command before the command is executed. Along with the command is data indicating which additional quorum members will be participating in a session, and which quorum persona they wish to invoke for the session. After verifying the signature, the system sends the command to a second quorum member, wherein the command is verified, or authenticated as originating from the first quorum member. Next, the system receives a signed response from the second quorum member, wherein the response indicates whether the second quorum member accepts or rejects the command. If the second quorum member accepts the command, the system sends the command to a native client which executes the command.

29 Claims, 7 Drawing Sheets

METHOD AND APPARATUS FOR IMPOSING QUORUM-BASED ACCESS CONTROL IN A COMPUTER SYSTEM

BACKGROUND

1. Field of the Invention

The present invention relates to computer security. More specifically, the present invention relates to a method for imposing quorum-based access control in a computer system.

2. Related Art

Many organizations have invested a large amount of time and money in developing tools to protect sensitive data. However, many enterprise applications that are used by these organizations share the same basic architecture, which makes them prone to security flaws. These enterprise applications typically include a database, a set of middle-tier servers containing logic that interacts with the database, a set of "sophisticated" security layers, and a set of backdoors that bypass most of the security.

Many enterprise applications share the same set of backdoors. For example, the root accounts on many middle-tier systems, and the operating system accounts used to install the middle-tier systems, can often obtain full access to the system when the systems reboot. This mechanism can potentially be exploited to gain unauthorized access to sensitive data. Additionally, users can often exploit the backdoors to gain access to privileged data accounts that many enterprise applications require for data processing.

System designers cannot completely eliminate these accounts and backdoors in existing systems because many of the backdoors exist to enable important operations. For example, applications often need to "bootstrap," which involves loading the first few instructions of an application and then using these instructions to load the rest of the application, and this bootstrapping process often requires a backdoor.

Although eliminating backdoors is not feasible in existing systems, a number of techniques exist to mitigate the problems resulting from having backdoors. One technique is to not give root privileges to any user, and to give individual users only permissions to perform limited actions. Although this solution can be effective, many of the operations that the user may need to perform require high-level privileges that make it difficult to completely limit the scope of the user's access. For example, if a user is required to log into a system as root to run a script, there is typically nothing to stop the user from modifying the script to perform any action that he or she wants to perform.

Furthermore, many organizations have practices and procedures in place that require approval from multiple sources before changing computing infrastructure. For example, in order to apply a software patch, an organization may require that two or more administrators approve the installation of the patch. However, this type of requirement is nothing more than an organizational policy. There typically exists no enforcement mechanism to ensure that an administrator secures approval from a second administrator before applying the patch. Thus, a single administrator is not forced to follow the organizational policy and can potentially install malicious software without seeking approval from another administrator.

Hence, what is needed is a method and an apparatus for executing a command on a computer system without the aforementioned problems.

SUMMARY

One embodiment of the present invention provides a system for executing a command on a computer system. During operation, the system receives a signed command from a first quorum member at a security manager, wherein one or more quorum members must accept the command before the command is executed. Along with the command is data indicating which additional quorum members will be participating in a session, and which quorum persona they wish to invoke for the session. After verifying the signature, the system sends the command to a second quorum member, wherein the command is verified, or authenticated as originating from the first quorum member. Next, the system receives a signed response from the second quorum member, wherein the response indicates whether the second quorum member accepts or rejects the command. If the second quorum member accepts the command, the system sends the command to a native client which executes the command.

In a variation on this embodiment, the data only indicates which quorum persona the first quorum member wishes to invoke. In this embodiment, the system can use any other method for determining the additional quorum members required to use the quorum persona. For example, the system may contact any potential quorum members that are currently online to create the quorum necessary to use the quorum persona.

In a variation on this embodiment, the system sets up a quorum persona at a new target system, wherein the quorum persona is an account used by quorum members to interact with the new target system via the security manager. While setting up the quorum persona, the system creates a first quorum persona profile associated with the quorum persona, wherein the first quorum persona profile determines whether the first quorum member has permission to access the new target system via the quorum persona. Next, the system uses the first quorum persona to create an account on the new target system. Finally, the system establishes a random password for the account.

In a further variation, the system creates a second quorum persona profile associated with the first quorum persona profile, wherein the second quorum persona profile determines whether the first quorum member has permission to modify the first quorum persona profile.

In a further variation, the first quorum persona profile can include an account name, an initial password, a native client field, a password change instruction, a logon instruction, a set of password complexity rules, a quorum definition, a set of usage conditions, a set of legal commands, a set of pre/post commands, a series of pre-filters, a series of post-filters, an authentication instruction, and a notification list.

In a further variation, the account name is a user name for an account on a target system.

In a further variation, the security manager uses the initial password the first time that the security manager logs into the account on the target system, and before establishing a random password for the account.

In a further variation, the native client field specifies how to launch the native client, and how to use the native client to interact with the target system.

In a further variation, the password change instruction specifies how to change the password for the account on the target system.

In a further variation, the logon instruction specifies how to logon to the account on the target system.

In a further variation, the set of password complexity rules is used to instruct the security manager on what specifications the random password must conform to.

In a further variation, the quorum definition specifies the number of quorum members, and the type of the quorum members that must log into the security manager to use the quorum persona.

In a further variation, the set of legal commands specifies what commands the first quorum member can execute using the quorum persona.

In a further variation, the set of pre/post commands specifies what commands are executed before and after the first quorum member uses the quorum persona.

In a further variation, the series of pre-filters are used to ensure that commands sent to the security manager from the first quorum member are formatted as commands that can be accepted by the target system.

In a further variation, the series of post-filters can be used to filter output generated from the command sent to the native client.

In a further variation, the authentication instruction specifies how to authenticate the first quorum member.

In a further variation, the notification list contains a list of users who should be notified of any usage of the quorum persona.

In a variation on this embodiment, the system sets up a quorum persona at an existing target system, wherein the quorum persona is an account used by the first quorum member to interact with the existing target system via the security manager. While setting up the quorum persona, the system creates a first quorum persona profile associated with the quorum persona, wherein the first quorum persona profile determines whether the first quorum member has permission to access the existing target system via the quorum persona. The system then creates a second quorum persona profile associated with the first quorum persona profile, wherein the second quorum persona profile determines whether the first quorum member has permission to modify the first persona profile. Next, the system logs into an account on the existing target system using an initial password. Finally, the system replaces the initial password for the account with a random password.

In a variation on this embodiment, the system establishes a communication session with a target system. This process begins when the system receives a request to establish communication with the target system from a group of users requesting to act as a quorum. Subsequently, the system launches a client for each member within the quorum, wherein the client provides an interface to the security manager. Next, the system authenticates the quorum members. The system then establishes a secure mechanism for propagating the identity of the quorum members during the communication session. The system then receives a selection indicating a quorum persona to use from the first quorum member. Next, the system validates the quorum using the quorum persona, wherein validating the quorum includes determining if the quorum members have permission to use the selected quorum persona. If the quorum is valid, the system launches the native client associated with the quorum persona. The system then passes a logon string to the native client, and sends the result of the logon attempt to the quorum members.

In a variation on this embodiment, the system filters the command before sending the command to the native interface. In doing so, the system rejects the command if the command does not pass a set of filter rules.

In a further variation, the quorum persona is an account created and controlled by the security manager for the purpose of acting as an intermediary between the first quorum member and the target system.

In a further variation, the set of usage conditions can include a time of day, a set of Internet Protocol addresses, a set of Media Access Control addresses, a length of time between uses, and a length of time that the quorum persona can be used.

In a variation on this embodiment, the second quorum member is allowed to pre-approve a set of commands that the first quorum member can send to the target system via the security manager.

In a variation on this embodiment, the security manager can be integrated into a target system.

In a variation on this embodiment, the security manager includes a customer pty/tty for sending the command to the native client.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Overview

One embodiment of the present invention operates by having software "take over" ownership of a single-user account. This can involve taking sole possession of the password and/or the public key infrastructure (PKI) keys for the account, and then requiring multiple approvals to be presented before allowing the single-user account to be used.

In one embodiment of the present invention, a system takes exclusive ownership of an existing account. This involves changing the account's password to a random value that is not known to any user, and keeping this value secret from all users.

The system then defines one or more "virtual users" with respect to the account, defines quorums of real users who are entitled to make use of these virtual user accounts, and defines which actions each virtual user is allowed to perform. For example, for an account with system database administrator privileges on a financials-database, the system could define two virtual user accounts: "findb-sysdba-normal" and "findb-sysdba-emergency." The system could then define a quorum of users who were privileged to perform operations using the "findb-sysdba-normal" virtual user as "any two members of the financials database administrator group," and a quorum of users who were entitled to use the "findb-sysdba-emergency" virtual user as "any one member of the all-data-center-administrator" group. Finally, the system can specify sets of operations, either using enumeration, regular expressions, or other limiting mechanisms tailored to the underlying access control system, that each virtual user is allowed to perform. Further, for each virtual user defined, the system shall be provided the name of a client interface process (such as "sqlplus", or "/bin/sh"), which can be used to pipe input as the virtual user to the target destination (such as a database, or a computer operating system), and include any addressing information needed to exercise the connection through this client input process to the target destination.

One embodiment of the present invention provides a system that facilitates using the "virtual user" (such as a dedicated agent, hosted either on the target system, or on some other secure system). Additionally, the system provides a mechanism for all potential members of the quorums who will be acting as virtual users to communicate with the agent in an authenticated manner. The agent, upon verifying that the input comes from a sufficient quorum of users entitled to act as a given virtual user, can then: launch (fork/exec) a new instance of the indicated process; define a pipe to write on which connects to the standard input of the newly launched process; and define a pipe to read from which connects to the standard output of the newly launched process. The agent can then logon to the target through this process as the destination user who this virtual user represents, and, after checking for valid input from an authorized quorum of users, pipe input into this process and stream output back from this process to the users.

To give a concrete example: lets say that Sue and Bob are members of the "dbadmin" group, and that there exists a virtual user "dbadmin-sysdba," which can be used by any two members of the "dbadmin" group. Further, assume that we have defined this virtual user to execute "sqlplus," connecting to the "sys" account on database "db." To use this account, Sue and Bob indicate their desire to enter into a session as virtual user "dbadmin." Sue types characters into an input device (such as a web browser). These characters are signed, or otherwise authenticated as having come from Sue, and are echoed on Bob's screen. Bob reviews the text, and if he approves of it, indicates his approval (such as by hitting an "accept" button), whereupon the text, now signed or otherwise authenticated as having come from both Sue and Bob, is sent to the agent. The agent then pipes this text into the standard input of "sqlplus," after having logged in to the database through "sqlplus" as user "sys" (using the password for user "sys" that the agent knows, but neither Sue nor Bob know). The agent then collects the output of "sqlplus" from the pipe it has connected to the "stdout" of the "sqlplus" process, and send this back to both Sue's and Bob's screen.

In one embodiment of the present invention, the system can restrict actions for any "virtual user," and within each "virtual user" the system can restrict each command or action that can be executed through the "virtual user."The system can restrict: the time of day that the action may be performed; the client address(es) from which the action may be performed; a pre-set expiration time after which the action may no longer be performed; and a counter of how many times the action may be performed (the degenerate counter value of "1" indicating a one-time-only permission).

In one embodiment of the present invention, the system is configured to automatically log all input and all output going through the system for each "virtual user," and to direct this input and output logging to one or more audit repositories or destinations (such as syslog, the Windows event log, a local file, a database, or an over-the-wire audit-logging web service) along with information describing the conditions of its use (such as the identities of the actual users, the definition of the virtual-user quorum which gave them the right to perform the action, the client addresses from which the real users performed the action, the time of day that the actions were performed, etc.)

In one embodiment of the present invention, the system can setup independent "notification lists," of one or more notification devices (such as email, SMS, arbitrary OS command, etc), with one or more notification addresses, to be automatically sent notification of the use of any "virtual user" or action combination, as well as the input and output logs of what transpired during use of the "virtual user."

In one embodiment of the present invention, for each "virtual user" or action combination, the ability to define and effect "pre-actions" and "post-actions," to be invoked any time any "virtual user" or action is invoked. For example, a "pre-action" can be defined to turn on additional auditing at the target level (above and beyond keystroke auditing at the input level), whenever a certain "virtual user" performs a highly privileged action, and a "post-action" to turn that auditing back off.

In one embodiment of the present invention, the system can define and impose arbitrary "filters" on the input provided for any process through the virtual user interface. For example, filters can be defined which restrict the input to known appropriate character sets, so that escape sequences could not be sent to the process as an attack, or could be defined to limit the total line-oriented input size to match the known buffer sizes of the receiving process to prevent buffer overflow attacks.

In one embodiment of the present invention, the system can use workflow-based approvals to authorize the use of virtual user accounts and actions without requiring on-line, simultaneous interactive session from the quorum members.

In one embodiment of the present invention, the system can be integrated directly into the target system.

Typically, a user is allowed to execute any command on a computer system within a set of commands which is consistent with the user's privilege level. However, it is very difficult to ensure that the allowed set of commands does not provide the user with a way to perform an action, intentionally or unintentionally, that is detrimental to an organization, or against the organization's policy. Furthermore, even if a user cannot cause harm using the set of allowed commands, the user may still be able to circumvent system security mechanisms by manually restarting a system and loading malicious software during the system boot sequence.

One embodiment of the present invention teaches a method for increasing the oversight on a user who is executing a command on a computer system. In this embodiment, a security manager acts as an intermediary between a user and a computer system. Each time the user attempts to execute a command on a target system, the security manager forwards the command to one or more additional users for approval before sending the command to the target system for execution. In this way, a user attempting to execute a harmful command which violates a policy must first convince one or more additional users to assist in executing the command. Hence, the present invention prevents a user from acting alone.

In one embodiment of the present invention, the security manager removes all accounts that exist on a target system. In this embodiment, a user must subsequently use the security manager to access the target system.

In one embodiment of the present invention, the target system is physically inaccessible. In this embodiment, a user can only access the target system via the security manager.

Computing Environment

Figure 1A:
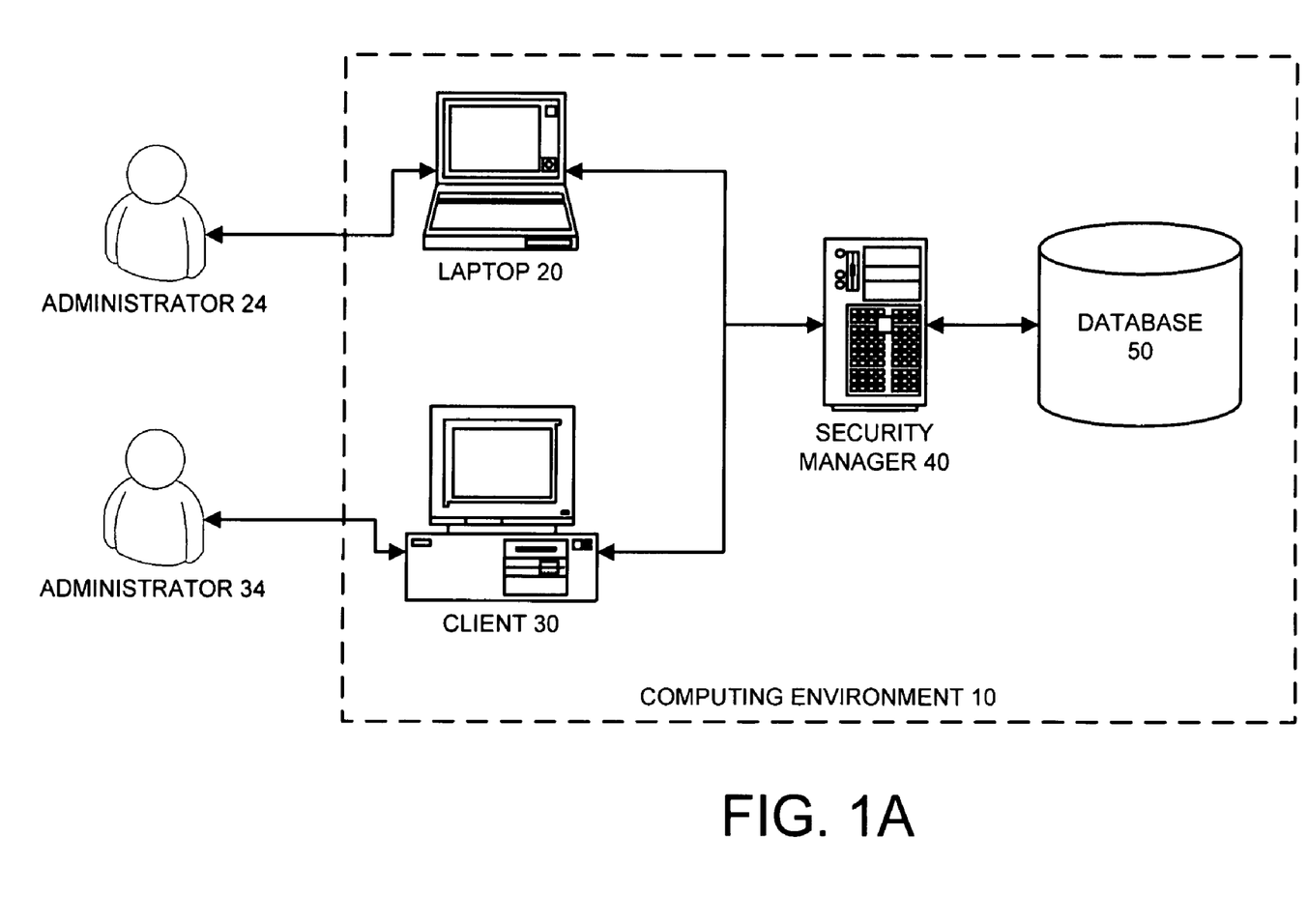
FIG. 1A illustrates a computing environment in accordance with an embodiment of the present invention.

FIG. 1A illustrates a computing environment 10 in accordance with an embodiment of the present invention. Computing environment 10 can generally include any type of computer system, including, but not limited to, a computer system based on a microprocessor, a mainframe computer, a digital signal processor, a portable computing device, a personal organizer, a device controller, and a computational engine within an appliance. Computing environment 10 includes laptop 20, client 30, security manager 40, and database 50.

Client 30 and laptop 20 can generally include any node on a network including computational capability and including a mechanism for communicating across the network. Client 30 and laptop 20 include a universal console that can send commands to security manager 40 and receive output responses from security manager 40.

Security manager 40 can generally include any computational node including a mechanism for servicing requests from a client for computational and/or data storage resources. Security manager 40 can act as an intermediary between a client and a server, a client and a client, or a server and a server, wherein a server can include a database. Security manager 40 can also be incorporated into a server. Security manager 40 includes a secure storage for passwords, metadata, and quorum personas. Security manager 40 can communicate with a native client that is included with database 50.

Database 50 can generally include any type of system for storing data in non-volatile storage. This includes, but is not limited to, systems based upon magnetic, optical, and magneto-optical storage devices, as well as storage devices based on flash memory and/or battery-backed up memory. Database 50 includes a native client configured to communicate with security manager 40. Database 50 includes a target account which can only be accessed by security manager 40 via a quorum persona.

In one embodiment of the present invention, administrator 24 and administrator 34 create a quorum persona for accessing database 50. A user can only access database 50 as a member of a quorum that is using the quorum persona to access database 50. Security manager 40 is configured to ensure that only a quorum matching the quorum definition defined by administrator 24 and administrator 34 is given access to database 50.

Figure 1B:
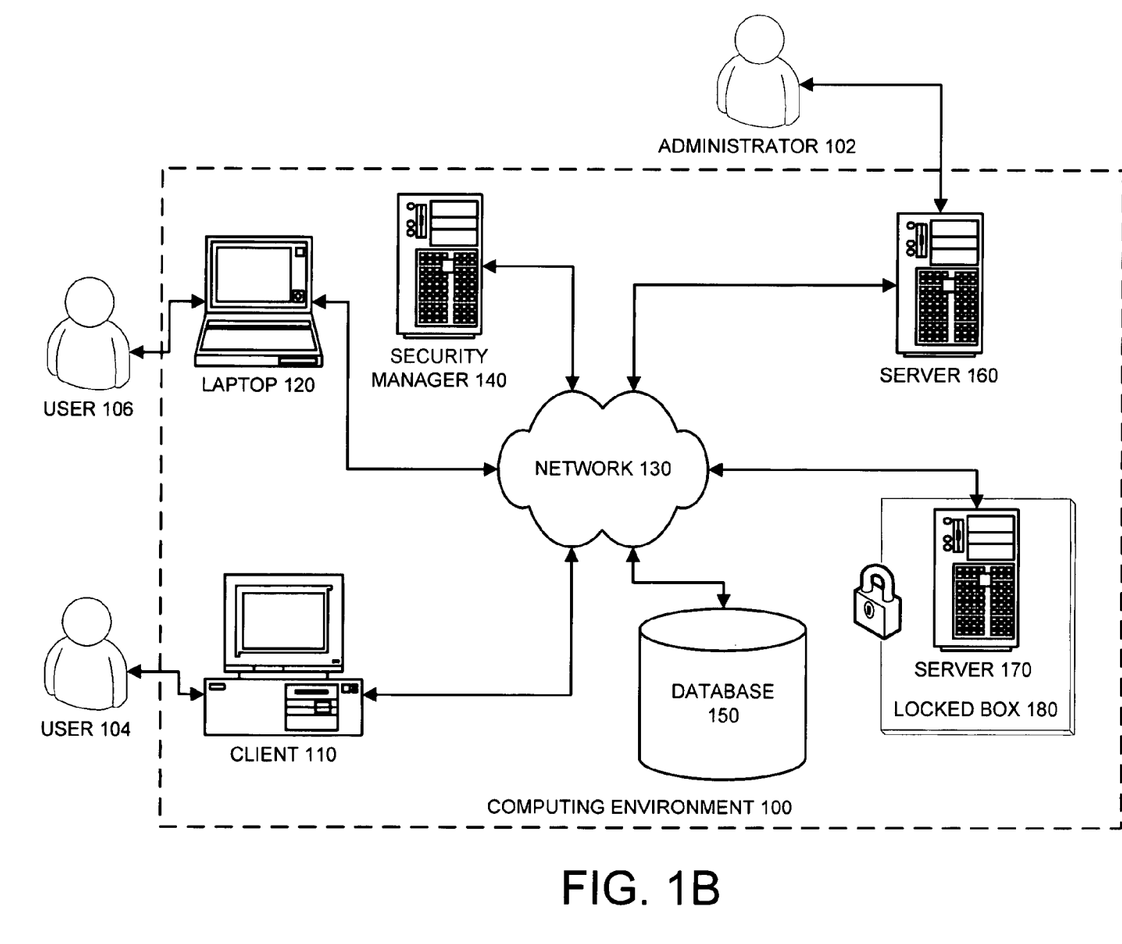
FIG. 1B illustrates a more complex computing environment in accordance with an embodiment of the present invention.

FIG. 1B illustrates a more complex computing environment 100 in accordance with an embodiment of the present invention. Computing environment 100 can generally include any type of computer system, including, but not limited to, a computer system based on a microprocessor, a mainframe computer, a digital signal processor, a portable computing device, a personal organizer, a device controller, and a computational engine within an appliance. Computing environment 100 includes client 110, laptop 120, network 130, and security manager 140. Computing environment 100 also includes a number of target systems, including, database 150, server 160, and server 170 locked within locked box 180.

Client 110 and laptop 120 can generally include any node on a network including computational capability and including a mechanism for communicating across the network.

Network 130 can generally include any type of wired or wireless communication channel capable of coupling together computing nodes. This includes, but is not limited to, a local area network, a wide area network, or a combination of networks. In one embodiment of the present invention, network 130 includes the Internet.

Security manager 140 can generally include any computational node including a mechanism for servicing requests from a client for computational and/or data storage resources. Security manager 140 can act as an intermediary between a client and a server, a client and a client, or a server and a server, wherein a server can include a database. Security manager 140 can also be incorporated into a server.

Database 150 can generally include any type of system for storing data in non-volatile storage. This includes, but is not limited to, systems based upon magnetic, optical, and magneto-optical storage devices, as well as storage devices based on flash memory and/or battery-backed up memory.

Servers 160 and 170 can generally include any nodes on a computer network which include a mechanism for servicing requests from a client for computational and/or data storage resources.

Locked box 180 can generally include any physical barrier that prevents a user from directly accessing a system.

In one embodiment of the present invention, security manager 140 has an account on database 150, server 160, and server 170. In this embodiment, there are no users, administrators, or other systems with accounts on database 150, and server 170. However, administrator 102 does have an account on server 160 and can directly access server 160 without using security manager 140 as an intermediary. Server 170 is locked within locked box 180, and therefore a user or administrator cannot directly access server 170 unless they have a key to locked box 180.

In one embodiment of the present invention, locked box 180 requires more than one key, and/or more than one user or administrator, to unlock locked box 180.

In one embodiment of the present invention, locked box 180 cannot be unlocked. In this embodiment, a failure in server 170 results in the elimination of server 170. Although this may increase the cost of system failures, it also increases the security of server 170.

In one embodiment of the present invention, user 104 does not have an account in database 150 and therefore first logs into security manager 140 when attempting to issue a command to database 150. After logging into security manager 140, user 104 selects a quorum persona profile that allows user 104 to send the command to database 150. For example, assume the quorum persona profile selected by user 104 requires a quorum of size two. User 106 logs into security manager 140 and identifies himself as the second quorum member. Security manager 140 then logs into database 150 using the account identified in the selected quorum persona profile. User 104 then receives an indicator that the login has succeeded, and sends the command to be executed on database 150 to security manager 140. Security manager 140 then sends the command to user 106 for approval. If user 106 approves the command, security manager 140 executes the command on database 150.

Quorum Scenarios

Figure 2:
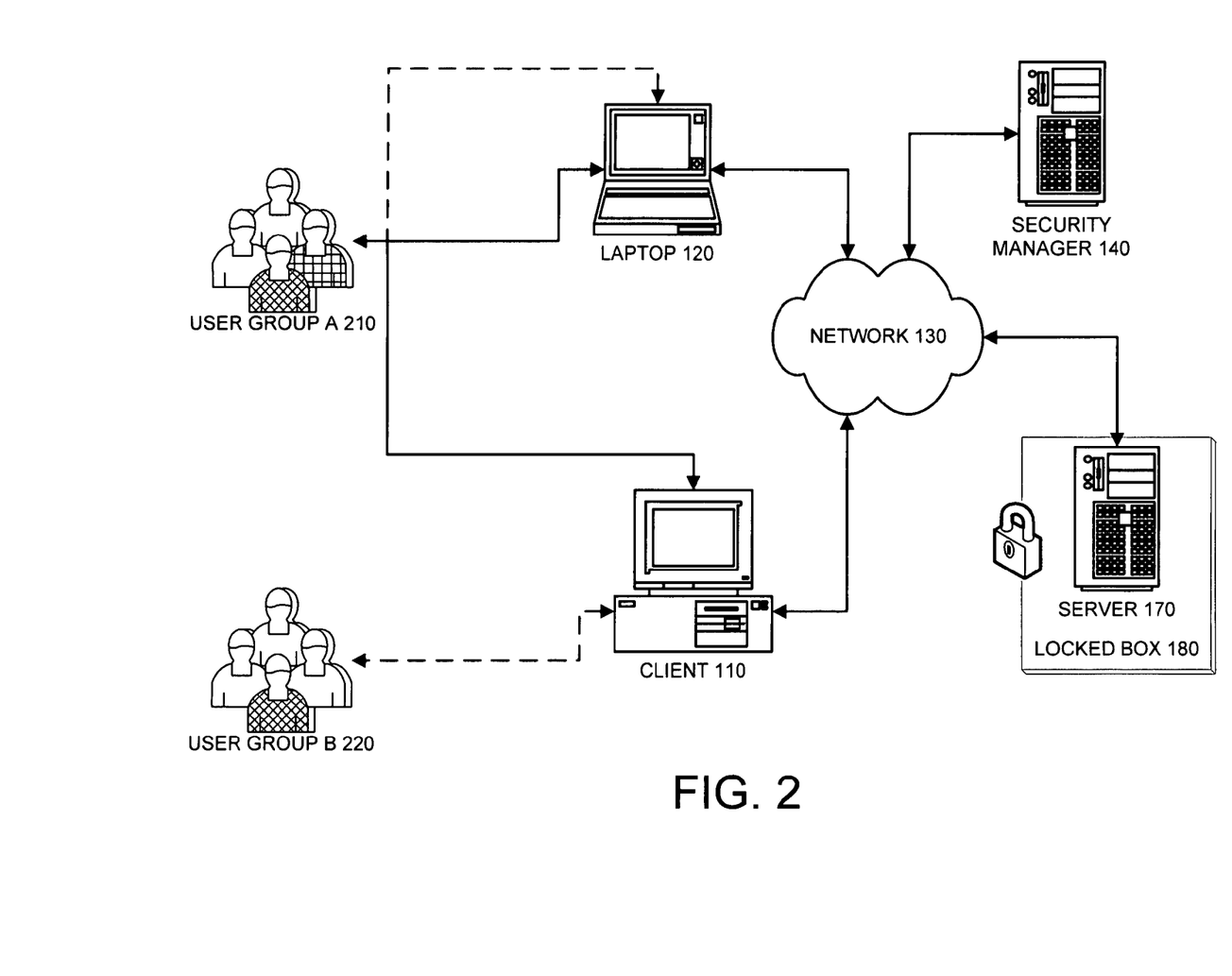
FIG. 2 illustrates two quorum scenarios in accordance with an embodiment of the present invention.

FIG. 2 illustrates two quorum scenarios in accordance with an embodiment of the present invention. In these quorum scenarios, only security manager 140 can directly communicate with server 170. Furthermore, in these scenarios, in order for a user to communicate with server 170 via security manager 140, the user must belong to a quorum including at least two quorum members, one of which is from user group A 210 and one of which is from user group B 220. Note that the quorum member from user group A 210 cannot be the same individual as the quorum member from user group B 220.

In the first quorum scenario, a first user (as illustrated by the diamond cross-hatched shirt) from user group A 210 logs into security manager 140 from laptop 120, and a second user (as illustrated by the square cross-hatched shirt) from user group A 210 logs into security manager 140 from client 110. The solid lines connecting user group A 210 to laptop 120 and client 110 illustrate this. The two users request to act as a quorum with the intent of accessing server 170. In this scenario, security manager 140 rejects the request from the two users because both users belong to user group A 210 and neither user belongs to user group B 220.

In the second quorum scenario, a first user (as illustrated by the diamond cross-hatched shirt) from user group A 210 logs into security manager 140 from laptop 120, and a first user (as illustrated by the diamond cross-hatched shirt) from user group B 220 logs into security manager 140 from client 110. The broken lines connecting user group A 210 to laptop 120, and user group B 220 to client 110 illustrate this. The two users request to act as a quorum with the intent of accessing server 170. In this case, security manager 140 accepts the request from the two users because one user belongs to user group A 210, and one user belongs to user group B 220.

In one embodiment of the present invention, the quorum can include only members from user group A 210. In this embodiment, security manager 140 would accept the request from the users in the first scenario.

In one embodiment of the present invention, a quorum can be a group of one.

Note that any user that is a member of user group A 210 and any user that is a member of user group B 220 can represent the user from user group A 210 and from user group B 220 respectively. The indicated users were chosen for exemplary purposes.

Quorum Persona Profile

Figure 3:
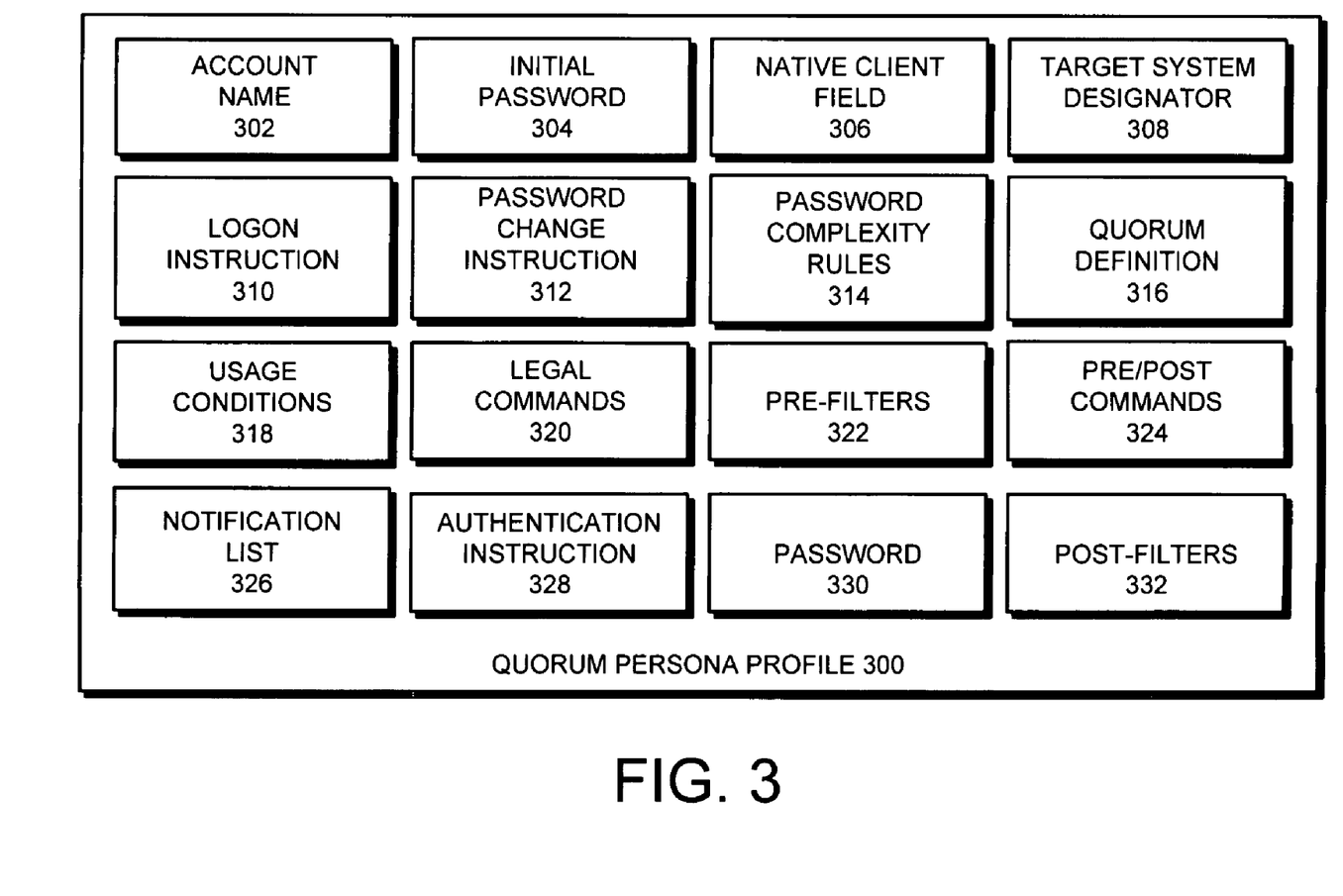
FIG. 3 illustrates a quorum persona profile in accordance with an embodiment of the present invention.

FIG. 3 illustrates a quorum persona profile 300 in accordance with an embodiment of the present invention. Quorum persona profile 300 defines a quorum persona by specifying who can use the quorum and how they can use the quorum persona.

In one embodiment of the present invention, the quorum persona functions as a "virtual user". In this embodiment, a user, typically an administrator, configures the quorum persona with a set of capabilities and privileges granted to this "virtual user". One or more users, who have permission to use this "virtual user" account, can use the quorum persona to send commands to a target system. More specifically, a user can use the quorum persona to access a target system associated with the quorum persona as specified by the target system designator 308 field of quorum persona profile 300. If security manager 140 determines that a user has authorization to use the quorum persona, the security manager grants the capabilities specified in the associated quorum persona profile 300 to the user. These capabilities can specify commands that the user can send to the target system associated with quorum persona profile 300.

In one embodiment of the present invention, quorum persona profile 300 is not associated with a target system. In this embodiment, quorum persona profile 300 is associated with a second quorum persona profile (not shown). The second quorum persona profile may be associated with a target system, or may be associated with yet a third quorum persona profile. If quorum persona profile 300 is associated with the second quorum persona profile, then a quorum uses the quorum persona associated with quorum persona profile 300 to modify the second quorum persona profile.

In one embodiment of the present invention, a user or quorum cannot edit quorum persona profile 300 after it is created.

In one embodiment of the present invention, a user cannot read the fields that are part of quorum persona profile 300.

In one embodiment of the present invention, the creator of quorum persona profile 300 can configure each field in quorum persona profile 300 to readable or unreadable, and writable or unwritable.

In one embodiment of the present invention, a quorum can only edit quorum persona profile 300 by using a quorum persona associated with a second quorum persona profile, wherein the second quorum persona profile is associated with quorum persona profile 300.

In one embodiment of the present invention, quorum persona profile 300 includes account name 302, which specifies the user name of the account on the target system.

In one embodiment of the present invention, quorum persona profile 300 includes initial password 304, which specifies the password originally associated with the account that the quorum persona is replacing. The first time that security manager 140 communicates with the target system after creating quorum persona profile 300, security manager 140 uses initial password 304 to login. Security manager 140 then changes the password for the account to password 330. Security manager 140 does not share password 330 with any other user or administrator.

In one embodiment of the present invention, quorum persona profile 300 includes native client field 306. Native client field 306 specifies how to launch the native client on the target system and how to interact with the native client on the target system.

In one embodiment of the present invention, quorum persona profile 300 includes target system designator 308, which identifies the computer system associated with the quorum persona.

In one embodiment of the present invention, quorum persona profile 300 includes logon instruction 310, which specifies how to logon to the target system.

In one embodiment of the present invention, quorum persona profile 300 includes password change instruction 312, which specifies how to change the password on the target system.

In one embodiment of the present invention, quorum persona profile 300 includes password complexity rules 314. Password complexity rules 314 specify the criteria for generating randomly generated password 330. Password complexity rules 314 also specify how often password 330 should be changed. In general, password complexity rules 314 are specified so that password 330 is as complex as the maximum complexity that the target system will accept.

In one embodiment of the present invention, quorum persona profile 300 includes quorum definition 316. Quorum definition 316 specifies the number of users and the type of users that must request to form a quorum in order to use the quorum persona defined by quorum persona profile 300. The type of users can refer to the level of a user within an organization's employee hierarchy as well as the group a user belongs to within an organization. For example, one quorum definition might specify that for a quorum to use the quorum persona defined by quorum persona profile 300, the quorum must include at least two users from the accounting group and at least one user from any group who has a minimum seniority of vice-president. In this example, a quorum must be at least size three.

In one embodiment of the present invention, quorum definition 316 may also identify specific users who must be part of the quorum requesting to use the quorum persona defined by quorum persona profile 300.

In one embodiment of the present invention, a quorum can be of size one. In this embodiment, the lone quorum member can use a quorum persona and execute a command using the quorum persona without permission from a second quorum member.

In one embodiment of the present invention, quorum persona profile 300 includes usage conditions 318. Usage conditions 318 can specify any additional criteria that a quorum must meet to use the quorum persona defined by quorum persona profile 300. For example, usage conditions 318 can include time of day, a set of Internet Protocol addresses that the quorum members must be communicating from, a set of Media Access Control addresses that the quorum members must be communicating from, a length of time between uses of the quorum persona, a length of time that the quorum persona can be used for, and a limit on the number of commands that can be issued via the quorum persona.

In one embodiment of the present invention, quorum persona profile 300 includes legal commands 320, which specifies commands that a quorum can send to the target system while using the quorum persona defined by quorum persona profile 300.

In one embodiment of the present invention, legal commands 320 specifies what commands cannot be sent to the target system while using the quorum persona defined by quorum persona profile 300.

In one embodiment of the present invention, legal commands 320 may restrict how many times a quorum can issue a command.

In one embodiment of the present invention, legal commands 320 may include a pre-set expiration time for a command. After the pre-set expiration time expires, a quorum cannot issue the command.

In one embodiment of the present invention, legal commands 320 may include tags with each command that specify additional operations that automatically execute if an associated command is issued. For example, these additional operations can include automatic logging. Security manager 140 and/or the target system may direct the result of this logging to one or more audit repositories and/or destinations.

In one embodiment of the present invention, quorum persona profile 300 includes pre-filters 322. Pre-filters 322 specify what filters a command passes through before security manager 140 sends it to the target system. The filters can include any type of limitation that the quorum persona profile 300 creator wants to place on a command. These limitations can include, but are not limited to, restricting the number of command arguments, the size of command arguments, the specific command arguments, command chaining (using a command as the argument to a command), and specific character sets.

In one embodiment of the present invention, quorum persona profile 300 includes pre/post commands 324. Pre/post commands 324 specify any command that security manager 140 can send to be executed before and/or after using the quorum persona defined by quorum persona profile 300. Pre/post commands 324 are useful for a number of tasks, including turning on and off auditing features, for target system clean-up, and for any other processes that should be executed every time a particular quorum persona is used.

In one embodiment of the present invention, quorum persona profile 300 includes notification list 326. Notification list 326 can include users to contact, instructions on how to contact users, criteria on when to contact users, and can specify what the notification should include (such as logs of what transpired that resulted in security manager 140 sending a notification). Notification list 326 is useful for informing administrators and officers of an organization when a quorum selects a particular quorum persona and/or when a quorum issues particular commands using a particular quorum persona.

In one embodiment of the present invention, quorum persona profile 300 includes authentication instruction 328. Authentication instruction 328 specifies how to authenticate users wishing to use the quorum persona associated with quorum persona profile 300. It is important to authenticate a user to ensure that only authorized users use the quorum persona defined by quorum persona profile 300, and to ensure that the proposed quorum satisfies quorum definition 316.

In one embodiment of the present invention, quorum persona profile 300 includes password 330. Password 330 specifies the password that security manager 140 uses to login to the target system. Security manager 140 creates password 330 the first time the security manager communicates with the target system after creation of quorum persona profile 300. Once security manager 140 generates password 330, initial password 304 is no longer valid. Security manager 140 does not reveal password 330 to a user.

In one embodiment of the present invention, an administrator can obtain password 330 from security manager 140.

In one embodiment of the present invention, quorum persona profile 300 includes post-filters 332. Post-filters 332 specify any filters that security manager 140 should use to filter a command response before sending the response to the quorum members. For example, post-filters 332 can include a filter that limits output sent to a quorum to the first 128 characters of an output response. This would enable the quorum members to see the success or failure of a command sent for execution on a target system, but limit the receipt of any information the quorum members may consider extraneous.

Account Creation

Figure 4:
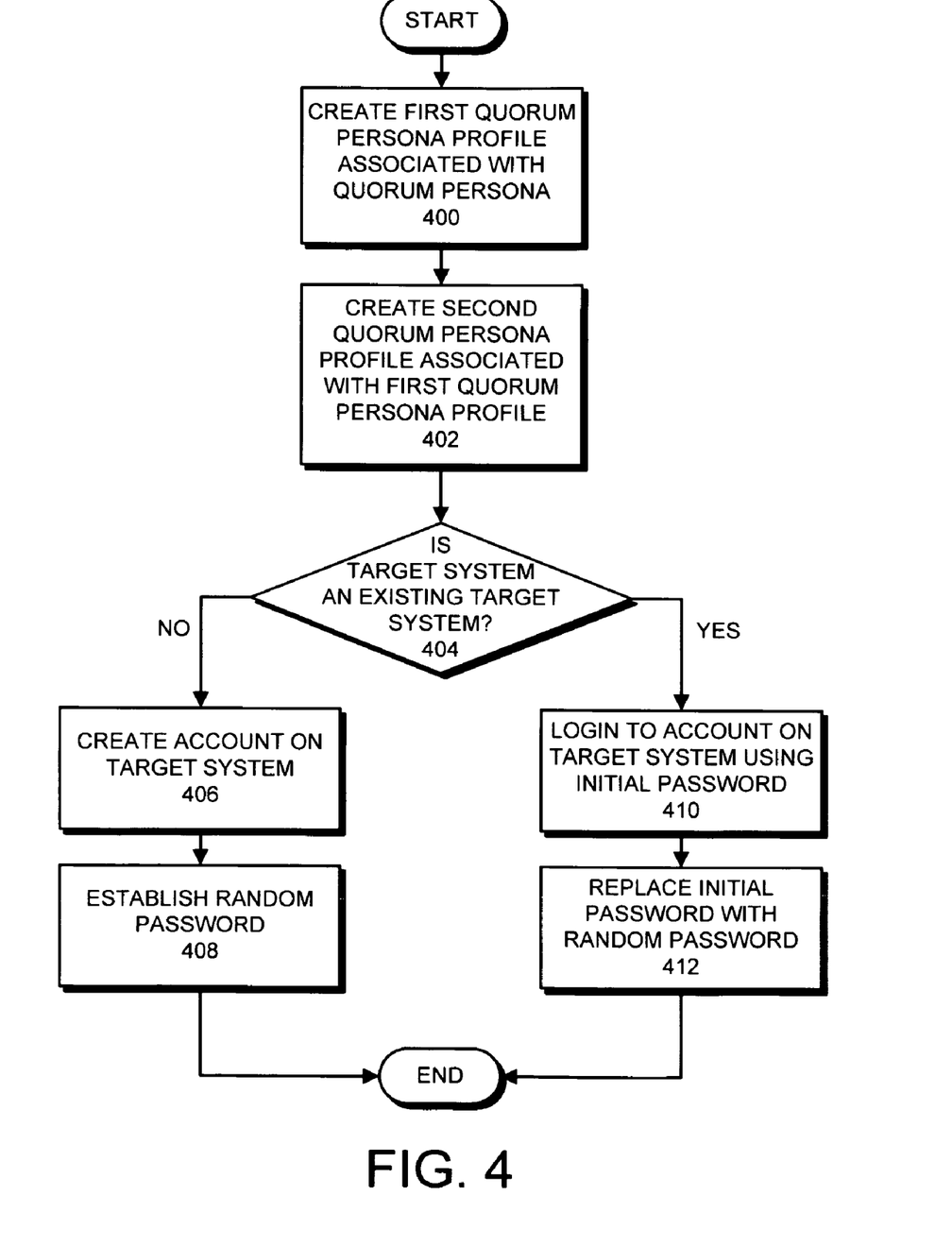
FIG. 4 presents a flowchart illustrating the process of setting up an account on a target system in accordance with an embodiment of the present invention.

FIG. 4 presents a flowchart illustrating the process of setting up an account on a target system in accordance with an embodiment of the present invention. Note that both existing systems and new systems can use the present invention because the present invention acts as a middle layer. In one embodiment of the present invention, security manager 140 can interface with a target system by configuring native client field 306 to contain the information necessary for security manager 140 to communicate with the target system. Thus, security manager 140 can interface with any existing or new target system. In one embodiment of the present invention, the first step in setting up an account on a target system is to create a quorum persona profile associated with a quorum persona (step 400). This quorum persona is an account used by a quorum to interact with the target system via security manager 140. The next step is to create a second quorum persona profile associated with the first quorum persona profile which defines a second quorum persona (step 402). A quorum uses the second quorum persona to modify the first quorum persona profile. Creating the second quorum persona profile is an optional step. However, if a second quorum persona profile is not created directly after the first quorum persona profile is created, then the first quorum persona profile cannot be modified.

In another embodiment of the present invention, the second quorum persona profile associated with the first quorum persona profile does not have to be created directly after the creation of the first quorum persona profile.

In one embodiment of the present invention, an administrator can edit the first quorum persona profile without using a second quorum persona profile.

After a user has created the quorum persona profiles, the system determines if the target system is an existing target system, or a new target system (step 404). If the target system is an existing target system, security manager 140 logs on to the target system using initial password 304 (step 410). Then, security manager 140 replaces initial password 304 with password 330 (step 412).

If the target system is a new target system, security manager 140 creates a new account on the target system (step 406). Then, security manager 140 establishes password 330 (step 408).

In one embodiment of the present invention, if the target system is an existing system, but the user wishes to create a new account, the system proceeds to step 406 from step 404.

Communication Link

Figure 5:
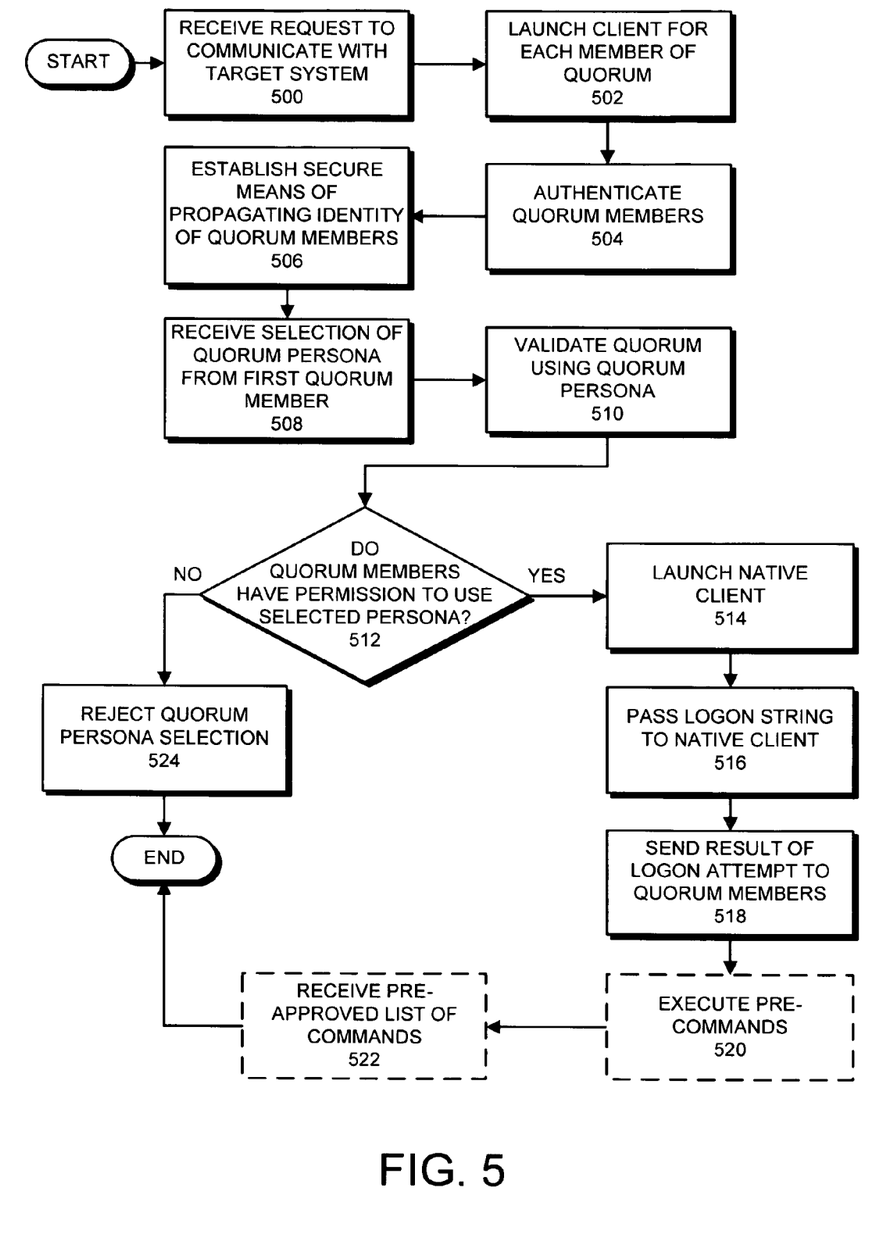
FIG. 5 presents a flowchart illustrating the process of establishing a communication link between a quorum and a target system via a security manager in accordance with an embodiment of the present invention.

FIG. 5 presents a flowchart illustrating the process of establishing a communication link between a quorum and a target system via a security manager 140 in accordance with an embodiment of the present invention. In one embodiment of the present invention, the first step in establishing such a communication link is to receive a request from a group of users requesting to act as a quorum to communicate with the target system (step 500). Security manager 140 then launches a client for each member of the requested quorum (step 502). Having security manager 140 launch the client provides the ability to maintain a common interface between security manager 140 and each member of the potential quorum. The client can be any system that can interface between security manager 140 and the members of the proposed quorum.

Next, security manager 140 authenticates each proposed quorum member using authentication rules defined by an administrator or a super-user (step 504). Security manager 140 then establishes a secure mechanism for propagating the identity of quorum members (step 506). One reason for propagating the identity of quorum members is to certify the identity of one quorum member to a second quorum member. This is necessary when the second quorum member is deciding whether to accept or reject a command the first quorum member is requesting to execute on the target system.

In one embodiment of the present invention, in order for security manager 140 to establish a secure mechanism for propagating the identity of quorum members, security manager 140 brokers an agreement between all quorum members, wherein the agreement specifies how to certify and propagate a quorum member's identity.

In one embodiment of the present invention, an administrator or an organization's policy determines the mechanism for certifying and propagating the identity of quorum members. In this embodiment of the present invention, an administrator pre-configures security manager 140 with the mechanism for certifying and propagating the identity of quorum members.

In one embodiment of the present invention, the "first" quorum member selects a quorum persona for communicating with the target system via security manager 140. The "first" quorum member is either the first quorum member to login to security manager 140, or the quorum member selected as the "first" quorum member by the other members of the quorum.

In one embodiment of the present invention, the quorum members select the "first" quorum member collectively.

Next, security manager 140 validates the quorum using the rules defined in quorum persona profile 300 (step 510). This step involves executing authentication instruction 328 and checking whether the proposed quorum is valid according to quorum definition 316.

Security manager 140 determines whether the quorum members have permission to use the selected quorum persona based on the results of step 510. If the quorum members do not have permission to use the selected quorum persona, security manager 140 rejects their quorum persona selection (step 524).

In one embodiment of the present invention, rejecting the quorum persona selection may involve: terminating the quorum members' session with security manager 140; removing the quorum members' authorization to login to security manager 140; and sending a notification to an administrator about the failed attempt to use the selected quorum persona.

If the quorum members do have permission to use the selected quorum persona, security manager 140 launches the native client on the target system following instructions detailed in native client field 306 (step 514). Next, security manager 140 passes the logon string defined in logon instruction 310 to the native client (step 516). The security manager then sends the result of the logon attempt to the quorum members (step 518).

In one embodiment of the present invention, security manager 140 executes the pre-commands defined in pre/post commands 324 (step 520). (This step is optional as illustrated by the broken lines surrounding step 520.)

In one embodiment of the present invention, step 520 occurs before each command is issued to the target system.

In one embodiment of the present invention, security manager 140 receives a pre-approved list of commands from the quorum members (step 522). In this embodiment of the present invention, all the quorum members must send the same command before it can be pre-approved. If the quorum members pre-approve a command, the "first" quorum member can issue the command without security manager 140 checking if the quorum members approve the command. In this embodiment, the "first" quorum member can only issue pre-approved commands during the communication session in which the quorum members pre-approved the commands. This step is optional as illustrated by the broken lines surrounding step 522.

In one embodiment of the present invention, security manager 140 can pre-approve quorum members. In this embodiment, the quorum can pre-approve a list of commands that the "first" quorum member can issue. In this embodiment, the "first" quorum member can log into security manager 140, and use the selected quorum persona at some time after the quorum has granted pre-approval. In this embodiment, the quorum can set an expiration time that specifies how long after pre-approval that the "first" quorum member can login and use the quorum persona.

Executing a Command

Figure 6:
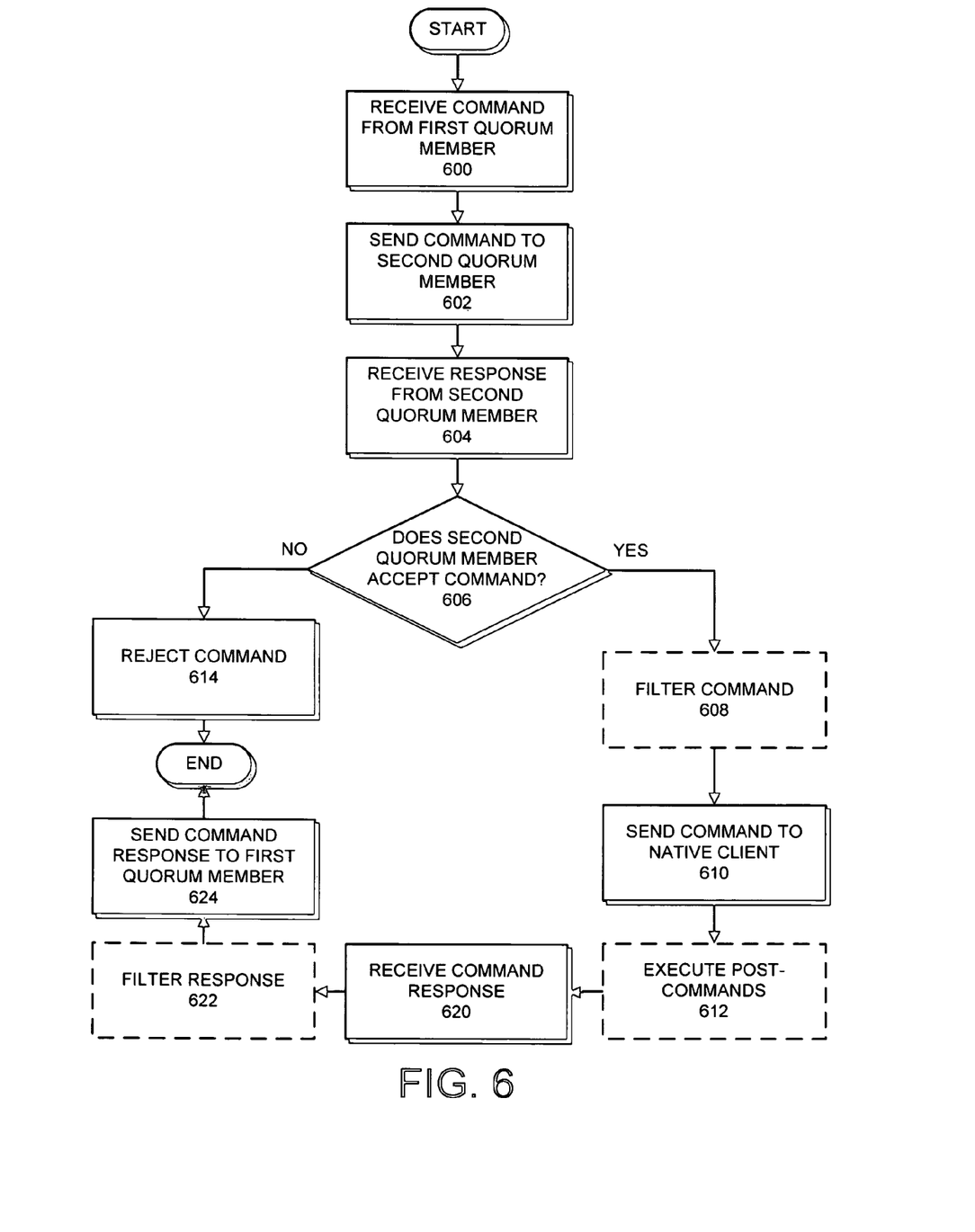
FIG. 6 presents a flowchart illustrating the process of executing a command in accordance with an embodiment of the present invention.

FIG. 6 presents a flowchart illustrating the process of executing a command in accordance with an embodiment of the present invention. In one embodiment of the present invention, the system starts by receiving the command from the first quorum member (step 600). Next, security manager 140 sends the command to the second quorum member to approve or reject (step 602).

Sending the command to the second quorum member can involve sending and certifying the identity of the first quorum member in a secure manner which is selected when the communications link between the quorum and the target system was established. Security manager 140 then receives a response from the second quorum member (step 604). Next, security manager 140 determines if the second quorum member accepted the command (step 606). If not, security manager 140 rejects the command by sending a notice of rejection to the first quorum member (step 614).

In one embodiment of the present invention, if the second quorum member accepts the command, security manager 140 filters the command according to the filter rules specified in pre-filters 322 (step 608). (This step is optional as illustrated by the broken lines surrounding step 608.)

Next, security manager 140 sends the command to the native client, following the rules specified in native client field 306, for execution on the target system (step 610).

In one embodiment of the present invention, security manager 140 executes the post-commands defined in pre/post commands 324 (step 612). (This step is optional as illustrated by the broken lines surrounding step 612.)

In one embodiment of the present invention, step 612 occurs after each command is issued to the target system.

In one embodiment of the present invention, step 612 occurs after the final command is issued to the target system in a session.

Next, security manager 140 receives a response from the target system to the command sent to the target system (step 620). Note that the response can include no response.

In one embodiment of the present invention, security manager 140 filters the response received from the target system (step 622). (This step is optional as illustrated by the broken lines surrounding step 622.)

Security manager 140 then sends the response to the command to the first quorum member (step 624).

In one embodiment of the present invention, security manager 140 sends any output generated by executing the command sent to the target system to each member of the quorum.

In one embodiment of the present invention, security manager 140 sends any output generated when executing the command that was sent to the target system to the first quorum member only.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for executing commands on a system, the method comprising:
    establishing, at a computer, a communication session with a target system for a user requesting to act as a quorum;
    creating, by the computer system, a first quorum persona profile that determines whether a first quorum member has permission to access shared virtual user account, wherein the first quorum persona profile specifies a count of the quorum members required to form the quorum;
    using, by the computer system, the first quorum persona profile to create an account on a target system;
    receiving, at the computer system, a command from the first quorum member who has accepted the command;
    sending, by the computer system, the command to a second quorum member who has been authenticated to access the virtual user account for acceptance of the command;
    receiving, at the computer system from the second quorum member, an acceptance of the command;
    Validating the quorum using the shared virtual user account;
    Launching a client for each quorum member responsive to validation of the quorum, wherein a logon string is passed to the client and a result of a logon attempt is passed on to the quorum members; and
    sending the command from the virtual user account to the target system for execution.

2. The method of claim 1, further comprises:
    creating a second quorum persona profile that determines whether the first quorum member has permission to modify the first quorum persona profile; and
    establishing a random password for the created account.

3. The method of claim 2, wherein the first quorum persona profile comprises one or more of:
    an account name which is a user name of the account on the target system;
    an initial password which is used by the computer system the first time the computer system logs into the created account on the target system, and before establishing a random password for the account;
    a native client field which specifies how to launch a client and how to use the client to interact with the target system;
    a password change instruction which specifies how to change the password for the account on the target system;
    a logon instruction which specifies how to logon to the account on the target system;
    a set of password complexity rules which is used to instruct the computer system on what specifications the random password must conform to;
    a quorum definition which specifies number and type of the quorum members who must be logged into the computer system to use the virtual user account;
    a set of usage conditions;
    a set of legal commands which specifies what commands are executed by the first quorum member using the virtual user account;
    a set of pre-commands or post-commands or both which specifies what commands are executed before and after the first quorum member uses the virtual user account;
    a series of pre-filters which are used to ensure that commands sent to the computer system from the first quorum member conform to commands accepted by the target system;
    a series of post-filters which are used to filter output generated from commands sent to the computer system;
    an authentication instruction which specifies how to authenticate the first quorum member; and
    a notification list which comprises a list of users who should be notified of any usage of the virtual user account.

4. The method of claim 1, wherein setting up the virtual user account comprises:
    creating a second quorum persona profile that determines whether the first quorum member has permission to modify the first persona profile;
    logging into an account on the target system using an initial password; and
    replacing the initial password with a random password for the account.

5. The method of claim 1, wherein establishing the communication session with the target system, further comprises:
receiving a request to establish the communication session with the target system from a group of users requesting to act as a quorum;
authenticating the quorum members;
establishing a secure mechanism for propagating identities of the quorum members for the duration of the communication session;
receiving a selection indicating a virtual user account to use from the first quorum member, wherein validating the quorum involves determining if the quorum members have permission to use the virtual user account; and
wherein the client provides an interface to a security manager in the computer system.

6. The method of claim 1, further comprising filtering the command before sending the command to the computer system, and rejecting the command if the command does not pass a set of pre-filter rules.

7. The method of claim 2, wherein the quorum persona is an account created and controlled by a security manager on the computer system for the purpose of acting as an intermediary between the first quorum member and the target system.

8. The method of claim 3, wherein the set of usage conditions comprises one or more of:
a time of day;
a set of Internet Protocol addresses;
a set of Media Access Control addresses;
a length of time between uses; and
a length of time that the quorum persona can be used.

9. The method of claim 1, wherein the second quorum member can pre-approve a set of commands that the first quorum member can send to the target system.

10. The method of claim 1, wherein the command is authenticated as coming from the first quorum member.

11. The method of claim 7, wherein the security manager is integrated with the target system.

12. The method of claim 11, wherein the security manager includes a custom pty/tty for sending the command to the target system.

13. A non-transitory computer-readable storage medium storing instructions that when executed by a computer cause the computer to perform a method for executing commands on a computer system, the method comprising:
establishing, at a computer, a communication session with a target system for a user requesting to act as a quorum;
creating, by a computer system, a first quorum persona profile that determines whether a first quorum member has permission to access setting up a virtual user account, wherein the first quorum persona profile, specifies a count of the quorum members required to form the quorum;
using, by the computer system, the first quorum persona profile to create an account on a target system;
receiving, at the computer system, a command from the first quorum member who has accepted the command;
sending, by the computer system, the command to a second quorum member who has been authenticated to access the virtual user account for acceptance of the command;
receiving, at the computer system from the second quorum member, an acceptance of the command; and
Validating the quorum using the shared virtual user account; Launching a client for each quorum member responsive to validation of the quorum, wherein a logon string is passed to the client and a result of a logon attempt is passed on to the quorum members;
sending, by the computer system, the command from the virtual user account to the target system for execution.

14. The non-transitory computer-readable storage medium of claim 13, wherein the method further comprises:
creating a second quorum persona profile that determines whether the first quorum member has permission to modify the first quorum persona profile;
establishing a random password for the created account.

15. The non-transitory computer-readable storage medium of claim 14, wherein the first quorum persona profile comprises one or more of:
an account name which is a user name of the account on the target system;
an initial password which is used by the computer system the first time the computer system logs into the created account on the target system, and before establishing a random password for the account;
a native client field which specifies how to launch a client and how to use the client to interact with the target system;
a password change instruction which specifies how to change the password for the account on the target system;
a logon instruction which specifies how to logon to the account on the target system;
a set of password complexity rules which is used to instruct the computer system on what specifications the random password must conform to;
a quorum definition which specifies number and type of the quorum members who must be logged into the computer system to use the virtual user account;
a set of usage conditions;
a set of legal commands which specifies what commands are executed by the first quorum member using the virtual user account;
a set of pre-commands or post-commands or both which specifies what commands are executed before and after the first quorum member uses the virtual user account;
a series of pre-filters which are used to ensure that commands sent to the virtual user account from the first quorum member conform to commands accepted by the target system;
a series of post-filters which are used to filter output generated from commands sent to the client;
an authentication instruction which specifies how to authenticate the first quorum member; and
a notification list which comprises a list of users who should be notified of any usage of the virtual user account.

16. The non-transitory computer-readable storage medium of claim 13, wherein the method further comprises:
creating a second quorum persona profile that determines whether the first quorum member has permission to modify the first persona profile;
logging into an account on the new target system using an initial password; and
replacing the initial password with a random password for the account.

17. The non-transitory computer-readable storage medium of claim 13, further comprising establishing a communication session with the new target system by:
receiving a request to establish the communication session with the new target system from a group of users requesting to act as a quorum;
authenticating the quorum members;

establishing a secure mechanism for propagating identities of the quorum members for the duration of the communication session;

receiving a selection indicating a virtual user account to use from the first quorum member, wherein validating the quorum involves determining if the quorum members have permission to use the virtual user account; and wherein the client provides an interface to a security manager in the computer system.

18. The non-transitory computer-readable storage medium of claim 13, further comprising filtering the command before sending the command to the computer system, and rejecting the command if the command does not pass a set of pre-filter rules.

19. The non-transitory computer-readable storage medium of claim 14, wherein the quorum persona is an account created and controlled by a security manager on the computer system for the purpose of acting as an intermediary between the first quorum member and the target system.

20. The non-transitory computer-readable storage medium of claim 15, wherein the set of usage conditions comprises one or more of:
- a time of day;
- a set of Internet Protocol addresses;
- a set of Media Access Control addresses;
- a length of time between uses; and
- a length of time that the quorum persona can be used.

21. The non-transitory computer-readable storage medium of claim 13, wherein the second quorum member pre-approves a set of commands that the first quorum member sends to the target system.

22. The non-transitory computer-readable storage medium of claim 13, wherein the command is authenticated as coming from the first quorum member.

23. The non-transitory computer-readable storage medium of claim 17, wherein the security manager is integrated into the target system.

24. The non-transitory computer-readable storage medium of claim 23, wherein the security manager includes a custom pty/tty for sending the command to the target system.

25. An apparatus that executes a command on a computer system, comprising:
- establishing, at a computer, a communication session with a target system for a user requesting to act as a quorum;
- a security manager;
- a native client;
- a target system;
- an initialization mechanism that creates a first quorum personal profile that determines whether a first quorum member has permission to access a virtual user account, wherein the first quorum personal profile specifies a count of the quorum members required to form the quorum, and wherein the initialization mechanism further uses the first quorum personal profile to create an account on a target system;
- a receiving mechanism that receives the command from the first quorum member who has accepted the command;
- a sending mechanism that sends the command to a second member of the quorum who has been authenticated to access to the virtual user account for acceptance of the command; and
- a receiving mechanism that receives, from the second member, an acceptance of the command;
- validating the quorum using the shared virtual user account; launching a client for each quorum member responsive to validation of the quorum, wherein a logon string is passed to the client and a result of a logon attempt is passed on to the quorum members;
- wherein the sending mechanism further sends the command from the virtual user account to the target system for execution.

26. The apparatus of claim 25, wherein the initialization mechanism further:
- creates a second quorum persona profile that determines whether the first quorum member has permission to modify the first quorum persona profile;
- uses the first quorum persona profile to create an account on a target system; and
- establishes a random password for the created account.

27. The apparatus of claim 25, wherein the initialization mechanism further:
- creates a second quorum persona profile that determines whether the first quorum member has permission to modify the first persona profile;
- logs into an account on the target system using an initial password; and
- replaces the initial password with a random password for the account.

28. The apparatus of claim 25, further comprising a communications mechanism that establishes a communication session with the target system by:
- receiving a request to establish the communication session with the target system from a group of users requesting to act as a quorum;
- authenticating the quorum members;
- establishing a secure mechanism for propagating identities of the quorum members for the duration of the communication session;
- receiving a selection indicating a virtual user account to use from the first quorum member, wherein validating
- the quorum involves determining if the quorum members have permission to use the virtual user account; and
- wherein the client provides an interface to a security manager in the computer system.

29. The apparatus of claim 25, further comprising a filtering mechanism configured to filter the command before sending the command to the target system, and rejecting the command if the command does not pass a set of pre-filter rules.

* * * * *